3,154,964
TORQUE CONVERTER
Douglas R. Lewis, P.O. Box 1128, Atascadero, Calif.
Filed Jan. 29, 1960, Ser. No. 5,478
4 Claims. (Cl. 74—472)

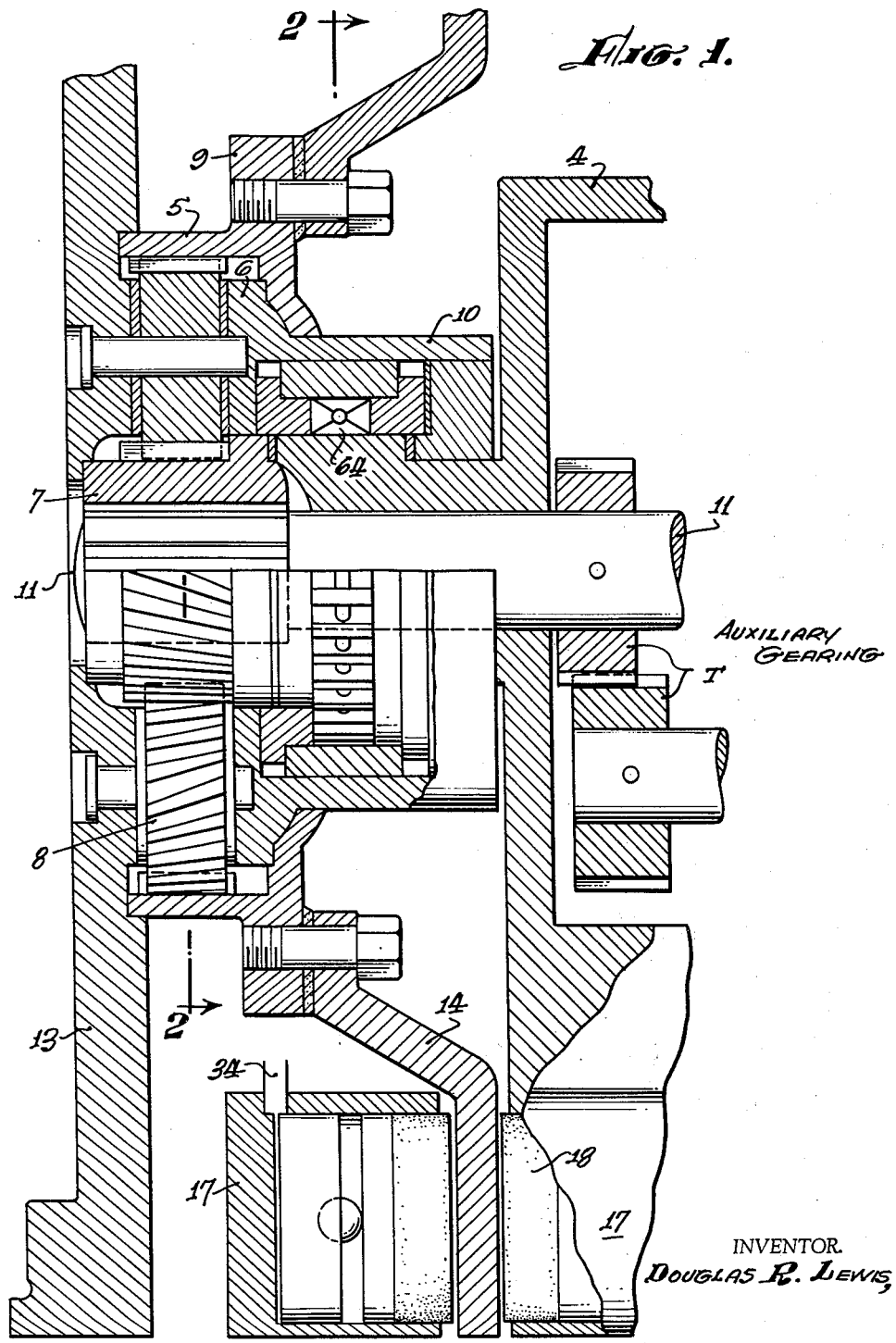

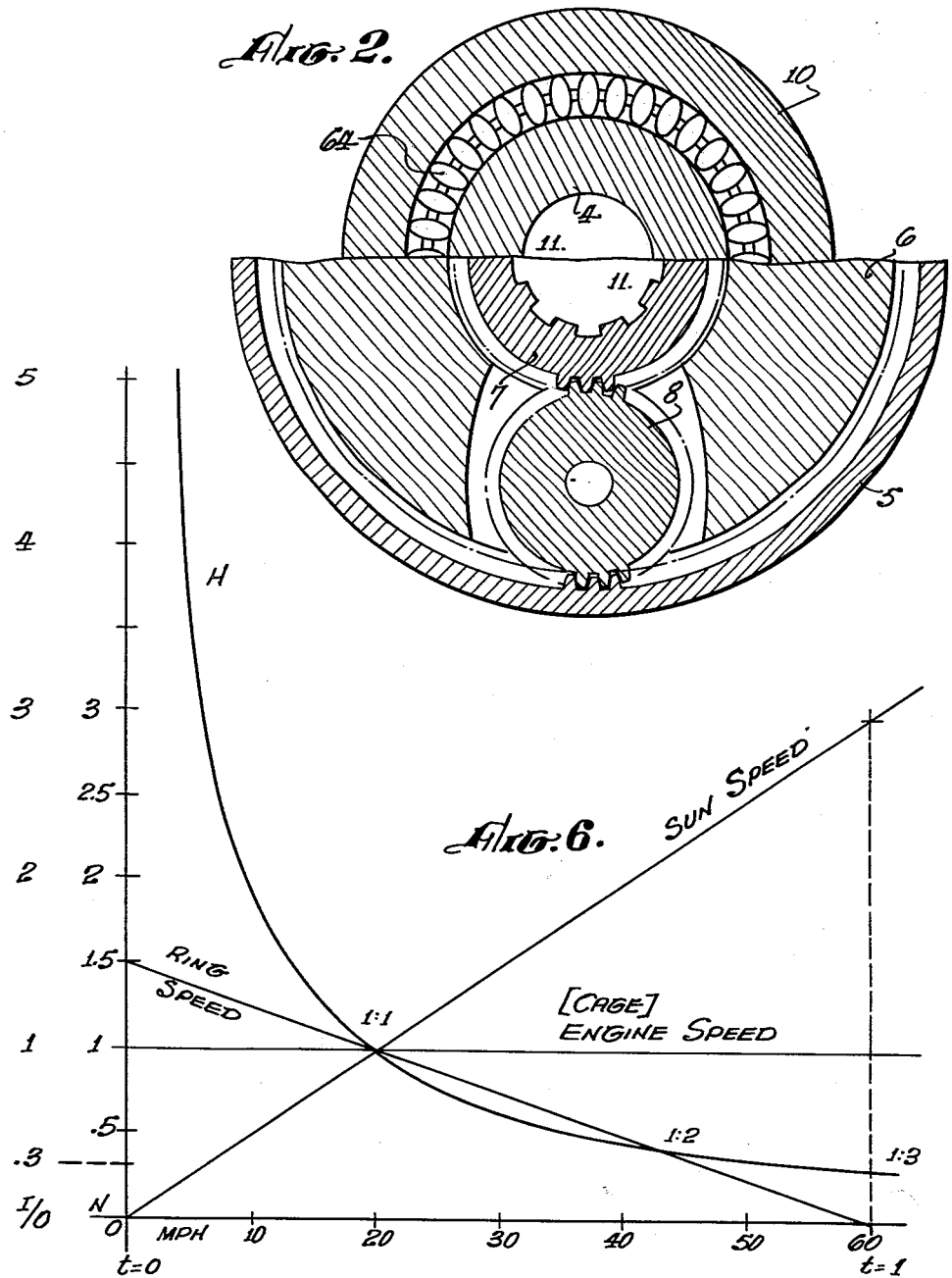

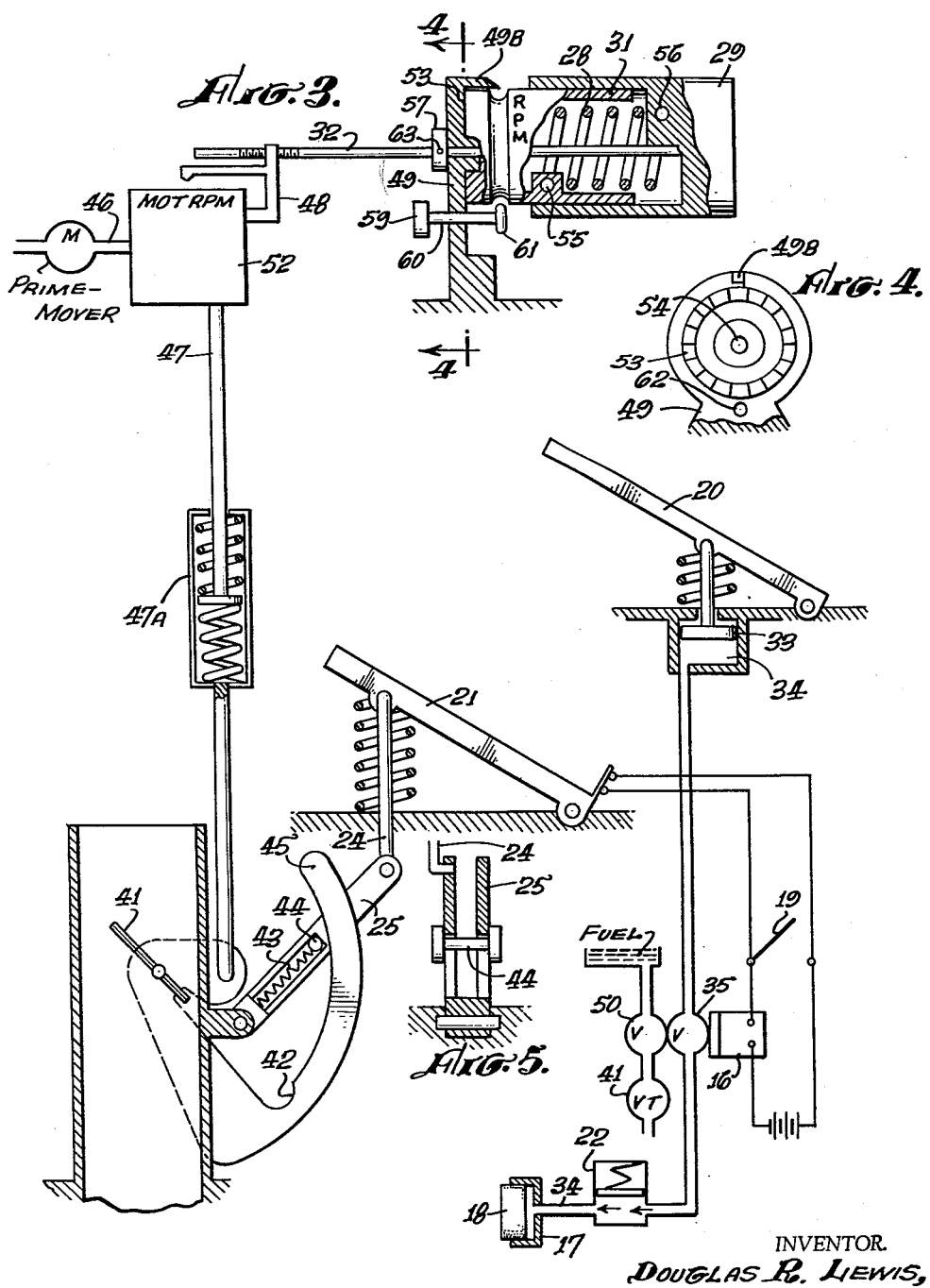

My invention relates to improvements in geared power transmission systems, particularly those in which an infinite number of torque and velocity ratios are available as continuous or stepless functions of a simple differential geartrain.

My invention is especially suited as a method of accelerating predictable loads which have considerable inertia, such as automobiles, flywheels and the like. To this end the torque-velocity needs of starting geartrains are recognized and supplied. Furthermore the inertia-velocity product of the moving load, that is to say momentum, is conserved. The load sensed by the prime-mover is a rate-of-momentum-change primarily, which causes this invention to closely approach the performance of the theoretically ideal transmission.

The custom of designing and applying planetary gears as if they were only capable of the fixed numerical ratios assigned to a given structural configuration has inhibited the extensive exploitation of such geartrains. Conventional transmissions require that the geartrain members be fixedly related *before* the load is applied. And there is always some load shock which requires further ingenious mechanisms to compensate the shock of engagement. Such transmissions are so constructed that failure to make the fairly abrupt holds and releases renders the units inoperative.

It is an object of the present invention to provide a planetary geartrain which can be induced to vary its input-output velocity and torque ratios in stepless progression between wide limits while supplying power to the load, even when there is only one torque-velocity input. This is analogous to making an infinitely large number of instantaneous shifts as load velocity varies. The advantage is obvious where high inertia loads are repeatedly started from a full stop, for stepless ratio change while under power means smooth acceleration up to full load speed. This invention recognizes the physical and psychological comfort of humans, who naturally prefer to perceive accelerated motion as a smoothly changing rate-of-acceleration. This invention provides high initial torque amplifications for starting high inertia loads having small translations which torque ratios diminish progressively as the loads approach upper limits momentum and more rapid translations.

Now torque converters have already become familiar intermediaries between prime-movers and mechanical change-gear transmissions. Typically such torque converters employ a hydraulic fluid medium which circulates regeneratively within a closed loop between input and output elements. The shortcomings of such conventional converters are numerous: very limited torque multiplication, poor heat dissipation, incessant slip, high cost and weight, design complexity, space requirements, potential leakage and bursting under tremendous hydrokinetic pressures, turbulence, inadequate capacity for engine-braking and push-starting, etc.

An object of this invention is to provide a simple variable torque converter which has permanently meshed gears as the medium of torque multiplication and transmission; which has a wide range of torque attitudes including the point of cessation of converter slip; which permits effective engine absorption of load momentum; which readily dissipates heat with a minimum of complexity into a simple heat exchange energy sink environment; and which avoids every hydrokinetic function except lubrication.

Heretofore nearly every transmission which relied on a positive or substantially non-slipping connection between the engine and the load has been subject to an inevitable and destructive condition of perpetual backlash. This condition may be described as a condition of incipient stall. Incipient stall is a state where the origin of the dominant impulse alternates between the engine and the load over an interval too brief for one impulse to greatly exceed the other yet long enough to keep some slight imbalance in favor of the preferred impulse, barely.

An object of this invention is to provide a coupling in which all impulses originating in the engine shall be rendered in a sequence separated from all load impulses (or backlash) by a perceptible controlled interval of negligible impulse or dead-zone, and where such a dead-zone or no-impulse interval does not follow an impulse the sequence of such impulses shall be in kind and in phase. An associated object of this invention is to demonstrate the method of conserving momentum which is accomplished by the dual expedients of separating the load and engine impulses from each other by the controlled stall interval, and by allowing the suppressed impulses to take residence in an inertia load or capacitor which is not identical with the impulse dissipator. Stall condition is found when the load dissipates momentum faster than the engine can supply it. The time interval needed for this to occur is so much shorter than the interval during which the whole conserved momentum could be dissipated as rolling friction and the like that the event is unlikely, except as a deliberately altered engine-braked load function.

Another related object of this invention is to demonstrate a method of imposing higher loads upon an engine in such a way as to permit its operating near its peak efficiency at all times. That is to say, this invention provides a system of power transmission which takes advantage of the great torque-thrust capacity of the internal combustion engines. When the stall inclination is sensitive to engine RPM, engine speed changes demand immediate corresponsive changes in load momentum even when the two factors are not optimally related for that change. This incipient stall condition is perpetual under most power transmissions as now employed and extra power must be generated just to compensate this stall propensity. Such needless power waste is avoided when the present invention is practiced.

Whenever mechanical connections between engine and load have been of a conventional make-or-break type, as with friction clutches, the act of engaging the input to the output has always involved compromising the relative velocities by some method which usually produces engagement shock. This difficulty is coexistent with the appearance of intense flash heat which is a function of that same shock engagement.

Another object of this invention is to provide a connection between an engine and an ultimate load which is subject to an arbitrary make-or-break relation of power flow but whose velocity relations are simple and predictable at all times so that engagement is shock-free and the heat of engagement starts to dissipate before engagement is complete.

An object of this invention is to provide unique controls and linkages which render the system operate and make this system compatible with other units which might conceivably be associated. The technique for using these controls is based largely on familiar control manipulations so that normal intelligence and long standing personal habits will be sufficient to insure skillful operation of the system with no more difficulty than that encountered in consecutive model control design of present practice, perhaps less.

The performance potential, that is to say the usefulness, of my invention in automobiles is realized as the practical answer to a long standing problem which has defied satisfactory solution so much as to have been deemed impossible in spite of theoretical and laboratory proof of feasibility.

This invention is concerned with providing help in reducing the noise, fuel waste and aerial contamination of urban and interurban transport in support of current efforts and intents of many agencies and devices. It is axiomatic upon the contention which correlates aerial contamination with fuel waste that measures to increase the efficiency of fuel use will materially reduce the incidence of fuel waste, carbon monoxide, and the voluminous outpouring of degenerate hydrocarbons. The concern follows upon the realization that modern transport arteries are hardsurfaced, smooth and plentiful. It is unthinkably primitive to restrict the highly developed passenger car and the predominate hardsurfaced modern viaduct to such a dependence on principles of road-vehicle relations borrowed from an outmoded transport era. Moreover, a mature and highly advanced technological society such as ours must concern itself with possible economies in the methods of degrading energy sources that have foreseeable limits.

The intent here is neither to introduce nebulous ideas nor hypothesize impractical devices with vague functions, but this innovation does not lend itself completely to the established language of the transmission art. In the absence of a rigorous mathematical treatment useful verbal statements are borrowed from other disciplines or coined. The concept of "lost-work" comes from the theory of "ideal machines" as treated in classical physics and inasmuch as momentum is conserved in my invention lost-work is the only real work done. A "virtual frame" is an element that may possess or be given some suitable degree of artificial massiveness to simulate or approximate the true massiveness quality of the absolute frame. Here, the quality of massiveness is imputed to several elements but insubstantially or "virtually" where the "FRAME" is redundant. I wish to define massiveness as: supportive inertia in excess of any conceivable associated reaction couple; the absolute quality of the inertia-reference link or absolute frame; relatively infinite inertia.

To induce controlled, variable, contiguous increments of such a quality as defined in the immediately preceding sentence in a redundant link of a differential geartrain is to synthesize a virtual frame which may be made identical to the absolute frame or which may be made to assume any lesser inertia value. Variable force reaction upon such a virtual frame establishes a unique system for controlled torque multiplication and distribution, and comprises the essence of my invention.

I propose to distinguish my invention from such others as the regenerative differential transmission which divides the rotary motion of the prime-mover, converts part of that rotary motion into some other form of energy as a shunted component, reconverts the shunted energy to rotary motion, recombines the torques and imposes automatically controlled amounts of the result upon the load. Recombining the divided power in such transmissions gives an effect of infinitely variable ratios comparable to the present invention. The theoretical saving by regenerating the shunted energy is illusory since the multiple conversions of energy occasion considerable losses and need complex transformers. In my invention the prime-mover only has to generate torque of minimum requirement for an instantaneous load value, and the divided component is either being reflected mechanically into the transmission stream or is non-existent. The loss of energy occasioned here is the energy which is used to synthesize the virtual frame, such as the friction heat loss in the disclosed embodiment. Any kinetic energy which tends to escape from the transmission stream must go into the synthesis of the virtual frame or be reflected from the virtual frame back into the transmission stream. As the inertia value of the virtual frame rises toward a maximum less lost-work is called for and more energy is reflected.

Lost-work has the axiomatic property of being required not-at-all when the system is operating most efficiently. Work is necessary to synthesize the virtual frame. No work is necessary to sustain the virtual frame. To absorb work from the degeneration of a virtual frame is essentially meaningless since that virtual frame exists as an inertia *effect* or *simulated* mass, and possesses no considerable momentum. Its true mass is small.

I further propose to distinguish my invention from such others as the infinitely-variable type transmission which typically has several eccentric resiliently abutted, rocked or cramped masses arranged to yieldingly dispose themselves in some progressive fashion against a mainshaft. Such transmissions are accurately described as "torque-limiting" inasmuch as they always take up a torque load gradually and will automatically take up only a predetermined torque load, which characteristic is the prime factor making them infinitely-variable. Such transmissions can supply an infinitely-variable output, true, but this output is always less than or equal to input torque. Thus they approach a torque input-output ratio of 1:1 as a limit. They do not multiply torque. In contrast, the present invention is a transmission whose output is a controlled infinitely variable multiple of torque input; having values available ranging steplessly from an infinitely high numerical ratio (starting reduction) for starting inertia loads, to a predictable low numerical ratio (powered speed limit) for sustained motion. Thus the present invention is truly a torque converter and it makes possible an indeterminable maximum torque multiple of input at full stall, which is the proper relation or torque-load values. Moreover, as has been stated elsewhere in this specification the engine is required to furnish only the instantaneous needs of the system which are to compensate lost-work and rate-of-change-of-momentum. Any inertia load having a value less than its absolute frame can be moved through such a torque converter as mine. Torque loads which are partially or ultimately inertia loads (such as vehicles, elevators) respond as inertia loads, that is to say they acquire momentum. Pure torque loads (inelastic torsion) can acquire no momentum and so are benefitted somewhat less for the incipient stall interval becomes instantaneous.

An operable system is herewith described. For this embodiment I have given my invention the role of motive-power converter-transmission in an automobile whose internal-combustion engine is capable of delivering a variable continuous torque output while operating within a narrow range of periodic cycles. Mechanisms for automatically producing such engine performance (governors) are well known. I should like to specify that the governor function is assumed to be essentially isochronous; that is to say the engine speed is not so directly tied to the engine speed regulator that large corrections can only accompany large speed changes, but rather such isochronous regulators anticipate engine needs with less lag.

Referring to the drawings:

FIGURE 1 is a view of a diametrical section taken along the axis of the infinitely variable torque converter and auxiliary gearing; the latter is depicted only partially, being well known.

FIGURE 2 is a cross-sectional view of the torque converter taken along bent line 2—2 of FIGURE 1.

FIGURE 3 is the integrated control schematic showing the interrelation of automatic and manual devices arranged for effectively influencing an operable torque converter system.

FIGURE 4 is a view of the manual governor-control assembly bracket taken along line 4—4 of FIGURE 3.

FIGURE 5 is a detailed sectional lateral view of the cam follower and follower arm shown nearby in FIGURE 3.

FIGURE 6 is a graph which describes idealized kinetic conditions of the members of the 3-element planetary geartrain of FIGURE 1 and FIGURE 2 which has a mechanical ratio of 3:1 as designed. The abscissa of this graph represents time. The ordinate represents the number of revolutions made by a member. A basic unit of revolution is the engine constant—it has a value of 1. Kinetic relation at any instant during the interval are easily seen to be immutably interdependent. The number of turns made by the sun gear is differentially related to the number of turns the cage (engine) is making by the number of turns allowed the ring gear relative to the frame in the same interval. The graph is primarily concerned with the interval during which a single power input is applied to accelerate a load (sun gear) from zero velocity to maximum velocity.

The hyperbolic curve H of FIGURE 6 follows the mechanical input-output ratio of the geartrain as it varies continuously over the power interval. Scalar units on the ordinate represent the mechanical ratio of input to output. Velocity is measured on the abscissa. The asymtotic character of hyperbolic curve H implies that the input-output ratios are unlimited in value and extend to infinity at the beginning of the interval. Although the method is not limited to the illustrated input-output configuration, this particular set-up gives a high overdrive effect at its powered upper limit. That is to say output velocity approaches, reaches equally and finally surpasses input velocity. The coincidence of several velocities and integral ratios is indicated. The torque multiples descend to 1:1 rapidly, but the successive integral ratios occur farther and farther apart with the inverted ratio 1/3 being the limit. Of course 1:3 is a practical, even modest, overdrive ratio when we consider that it occurs at the *end* of a shift and no further acceleration is called for. It is not practical to document all the endless variations of line which might represent instantaneous conditions loading, throttling etc., but the relations are predictable.

Structurally, the frame 4 supports all the other members. Radially supported upon the frame 4 is the planetary gearset which is mounted rotatably dependent with the driving element 13 through the pinion-carrier or cage 6 which is integral with the prime-mover output element 13. Disposed coaxial with the rotatably dependent upon the cage 6 is the internal gear or ring gear 5 which is linked to and supported upon the cage 6 through the pinion gears or planets 8, the cage 6 being radially supported by the frame 4 when necessary. The ring gear 5 has an extension 9 bearing an integral clutchable disc 14 of the type known as spot-brake or disc-brake discs. Disposed coaxial with and rotatably dependent upon the cage 6 in opposition to the ring gear 5 is the sun gear 7 which is linked to and supported upon the cage 6 through the planets 8. The sun gear 7 and its integral output shaft 11 are radially supported by the frame 4 where appropriate.

Mounted integral with the frame 4 is rigid bracket 17 which supports movable friction pads 18 and directs fluid pressure to the braking pads 18 which pressure is then frictionally transmitted to the braked disc 14 through the braking pads 18. Lever 20 carries a hydraulic piston 33 which moves under pilot signals to impart suitable force directly to the hydraulic fluid 34 and remotely to the pads 18 and the pressure accumulator 22. When lever 20 is restored to its position of rest upon cessation of pilot signals piston 33 no longer imparts pressure to the circuit. Cessation of hydraulic pressure at the pads 18, however, is also dependent upon the position of relay-controlled unloading valve 35 which regulates the pressure of accumulator 22. Such valved pressure-accumulator devices are well known and typically function so that the operator may elect to maintain an existing hydraulic pressure, add to the existing pressure without detriment, or release the entire accumulated pressure at will while the device itself introduces no additional pressure into the hydraulic circuit. Unloading valve 35 is automatically positioned by valve-operating relay 16 so as to effect the retention or non-retention of accumulator pressure, dependent upon relay-exciting signals from lever 21 or switch 19. Lever 21 in its position of rest completes a relay-exciting circuit which renders unloading valve 35 open, permitting exclusive pressure control by lever 20. Pilot-operable switch 19 can be closed at will to render valve 35 open regardless of position of lever 21; or switch 19 can be opened to the position of circuit dependence on lever 21. In the dependent position relay 16 causes valve 35 to inhibit bleed-back of accumulator pressure into the charging line when lever 21 is away from its position of rest.

The cage 6 is radially supported by the frame 4 through the shaft 10 which is an integral extension of the cage 6. Interposed between the shaft 10 and an appropriate portion of the frame 4 there is a one-way or overrunning sprag clutch 64 which bears upon the shaft 10 and the frame 4 simultaneously so as to prevent the rotation of the shaft 10 and its integral cage 6 and driving element 13 in one direction while freely admitting the rotation of those elements in the opposite direction which free rotation is the motion engendered by the intended function of the prime-mover.

Link 24 transmits motion from lever 21 to an arm 25 which pivots in motion upon the frame 4 through an arc co-planar but eccentric to the arc described by the motion of throttle cam 45. Upon the arm 25 is a cam follower 44 which is free to move along a radius of the arm 25 subject to pressure from a light spring 43 which pressure tends to keep the follower 44 at its greatest permissible radius. Tension of spring 43 is less than sufficient to inhibit sliding freedom of follower 44 along cam 45. The cam 45 has a notch 42 on a portion of its actuating surface so that follower 44 may be detained therein and the angular motion of cam 45 is synchronous with the angular motion of follower 44 during the detention. Cam 45 is fixed to the throttle valve 41 and turns concentric with the throttle valve 41. When self-restoring lever 21 is at rest link 24 holds arm 25 so that follower 44 is free from any angular apposition with cam 45 and motion of throttle valve 41 is independent of lever 21. Motion of lever 21 causes arm 25 to move follower 44 against cam 45. Continued motion of follower 44 is dependent upon all restraints acting upon it and it tends to follow slidingly along the surface of cam 45 until its progress is arrested by notch 42 or altered motion of lever 21. When follower 44 is seated in notch 42 the motion of lever 21 dictates the motion of valve 41. The period of possible detention of follower 44 in notch 42 is so arranged as to coincide with the travel of valve 41 from full open throttle to idle or some minimum closed throttle. Motion of lever 21 toward its position of rest carries follower 44 back through its arc of detention and away from any possible contact with cam 45, for as the notch 42 moves coincident with throttle closing the path of follower 44 departs from the arc of the cam 45 and the follower 44 is free and independent of cam 45 as the lever 21 returns to rest.

Fuel from the fuel supply passes through an "on-off" fuel valve 50 on its way to the engine fuel intake. Valve 50 is automatically positioned "on" or "off" by valve-operating relay 16 under relay-exciting signals from lever 21 or switch 19. Lever 21 in its position of rest completes a relay-exciting circuit which renders the valve 50 "on." Pilot-operable switch 19 can be positioned at will to render valve 50 "on" regardless of position of lever 21, or left in the position of dependence on lever 21. In the dependent position relay 16 renders the valve 50

"off" when lever 21 is away from its position of rest, thus completely stopping the flow of fuel to the engine.

The governor 52 for the prime-mover is a speed sensitive device which throttles or controls the engine power-generating requirements at varying mini-max engine loads by tending to maintain an arbitrarily set balance calibrated to coincide with certain engine speeds and which balance is subject to alteration at will by the operator. The governor 52 has an engine-speed dependent signal input 46, a power-controlling output signal transmitted through link 47, and a pilot-operable calibrated balance compensator 48 relating governor input 46 to output 47. The manual governor-control spindle 29 permits ad lib adjustment of the balance compensator 48 over its calibrated range by the operator. The frame-mounted bracket 49 supports a pilot-operable governor-control assembly which serves to advance or to retard the setting of compensator 48 and thereby alter governed engine speed at will. Governor-control rod 32 is integral with governor-control spindle 29 and imparts motion to compensator 48. Rotary motion of spindle 29 is transferred through rod 32 to compensator 48, to become a new compensator balance at the governor 52. The bracket 49 also supports a separate hollow sleeve 31 which has around finished portions of its outer circumference a groove 58 and related symbolic positions of compensator calibrations (RPM . . . ). A tab 49B or portion of the bracket 49 is a reference or indicator for the symbolic positions. This hollow sleeve 31 is prepared at one end to clutchingly engage prepared faces or splines 53 on a portion of bracket 49 so that the forced engagement of clutch 53 will keep the sleeve 31 from turning. The sleeve 31 is concentric with governor-control rod 32 and with an extended aperture 54 in bracket 49 through which rod 32 passes and on which it bears. The sleeve 31 is concentric with governor-control spindle 29, and a portion of sleeve 31 serves as a bearing for spindle 29. Furthermore, the sleeve 31 has as a part of its inner surface an anchorage 55 to positively anchor one end of a resilient element 28 capable of elastic compression and torsion. This coil spring 28 is also positively anchored at its other end to a portion or anchorage 56 of the spindle 29. When set-screw 63 limits the assembly the thrust-bearing collar 57 or keeper rotatably holds the rod 32 and spindle 29 axially stable relative to the bracket 49 and the sleeve 31. The spindle 29 forces the spring 28 to hold sleeve 31 clutched to bracket 49. Rotating the spindle 29 and rod 32 to temporarily change engine speed winds the spring 28 for return to preset idle upon release. It is also possible to reset the idle to a changed value by moving spindle 29 to a new angular position and simultaneously pressing pushbutton 59. The sleeve 31 with its groove 58 is forced to compress spring 28 thus disengaging clutch 53. Thereupon, torsion in spring 28 rotates sleeve 31 to a new position and the release of spindle 29 causes no further reaction. Pushbutton 59 is released and the reclutching of the sleeve 31 to bracket 49 establishes a new idle governor set or compensator balance. The pushbutton 59 has a stiff integral shaft 60 which passes through an aperture 62 in bracket 49. The distal end of shaft 60 is a gland or flange 61 which rides in bearing race or groove 58. Declutching by motion of pushbutton 59 shifts groove 58 and hence sleeve 31 axially and permits sleeve 31 to rotate freely with torsion of spring 28.

Governor output link 47 transmits engine-control signals to cam 45 and throttle 41 so as to control engine intake. The link 47 however is rendered dependent upon the condition of governor-override occasioned by the aforementioned positive control of cam 45 and valve 41 by lever 21 under cam 45 detention of follower 44. Link 47 incorporates a dashpot 47A of such resilience as can transmit governor output signals substantially unaltered to cam 45 when cam 45 is independent of lever 21 and follower 44 but which dashpot 47A can absorb governor output signals without conflicting with the positive override control of cam 45 by lever 21.

To describe the operation of the system we shall make the initial assumption that the vehicle is standing motionless on a level surface by virtue of its inertia and friction. Its engine is idling at the governor RPM setting and all clutches and brakes are released. Levers 20 and 21 are at their position of rest which positions are restored by appropriate means when the respective levers are not under influence of the operator. Sun gear 7 is motionless because the wheels which are the ultimate load on the sun gear 7 are motionless. The cage 6 turns with the engine, and the ring gear 5 with its shaft 9 and disc 14 turns faster than the engine. Auxiliary gear train T is engaged. The operator presses lever 20 which exerts force upon pads 18 in proportion to the position and pressure of lever 20 from rest. Friction upon disc 14 retards the motion of disc 14 and consequently ring gear 5 while the engine continues to turn at a constant governed RPM. Differential action in the converter causes greater engine effort to be delivered to the sun gear 7 and its shaft 11 and eventually to the load reactively as the ring gear 5 is retarded. The sun shaft 11 is part of a linkage which provides positive tractive effort by engaging the wheels to turn against sliding friction. When output leverage becomes great enough to overcome vehicle inertia and starting friction the vehicle will move. The position of lever 20 is altered to change or maintain vehicle speed relative to the surface. The vehicle's momentum increases as the lever 20 is continually urged downward until the lever travel is at end or until the vehicle speed has reached the highest value possible for the particular condition of the system; load. The vehicle's momentum can be maintained by continuously replenishing friction losses (lost-work etc.). At the highest possible powered ratio the ring gear 5 is synchronous with the vehicle frame angular velocity (nil). In this condition, small differences in momentum gain or loss tend to change the angular velocity of the ring gear 5 very little and the minimum effort to correct this difference is all that can be used. If the lever 20 is allowed to return to its position of rest the vehicle will dissipate its momentum as kinetic energy.

For greater vehicle speed than the aforementioned peak it is necessary to alter the overall geartrain ratio; or motionward thrust (as from a tailwind); or the rate-of-momentum-change (as going downhill); or increasing engine RPM. Engine speed increases should ordinarily be made with the lever 20 fully released and at rest. For temporary engine-speed increase governor-control spindle 29 is rotated so as to increase the setting of compensator 48 until the desired engine speed is reached, and held there as long as necessary. Release of spindle 29 causes it to then return to the preset idle. Other manipulations of engine speed are described elsewhere in this specification.

If the lever 20 be pressed downward so as to cause considerable braking force upon disc 14, and if switch 19 be positioned so as to render fuel valve 50 dependent upon motion of lever 21; motion of lever 21 away from its position of rest renders valve 50 "off," restricts the accumulated pressure in the hydraulic circuit by the check-valve action of valve 35, and positively controls the motion of throttle valve 41 through the override device, thereby producing a variable braking effort from the fuel-less engine which is constrained to turn by momentum of the moving vehicle. Further motion of lever 21 to vary the opening of throttle valve 41 makes the braking variable by changing the compression charge. This is use of the engine as a retarding air-pump since no fuel is being burned. This control could be used on a downgrade or from high surface speeds for moderate controlled retardation of the vehicle. These engine-braking maneuvers are best as slow-down methods and to supplement but not supplant wheel-binding brakes for vehicular motion-checks.

The inverse of this braking maneuver is met when the fuelless engine of the moving vehicle is not turning. The switch 19 is set to open unloading valve 35 and to render fuel valve 50 "on" independently of lever 21. Lever 20 is gradually urged to retard the motion of disc 14 to effect a rolling or push start with little or no engine shock. Since engine governor 52 is ineffective at this condition of no engine RPM lever 21 is moved to engage the throttle valve 41 positively for appropriate positioning of the valve 41 as long as desired or until the engine functions under its own power. When the engine starts, the function of governor 52 becomes meaningful since that unit has an engine-velocity-dependent input.

The vehicle is now brought to a halt with the engine turning under power. Levers 20 and 21 are released and assume their positions of rest. The engine idles at governed RPM setting. All clutches and brakes are released and the vehicle stands inert on a level surface.

It is obvious to those who are familiar with such matters that the details of construction and function presented here fall far short of exhausting all possible constructions and functions conceivable in the light of the novel method disclosed here. Therefore the residence in this invention of such obvious constructions and functions as have been omitted from this presentation shall remain inviolate except as legally provided for otherwise; and these obvious omissions shall not in any case be construed as abandoned where their residence in my invention is demonstrable.

I claim:

1. In a system of torque transmission including a variable torque converter having mechanically pressurized elements and a governed airbreathing prime-mover, control apparatus comprising:
    a governor operatively conjoined with a variable metering means for the prime-mover intake, said governor varying the intake-metering means according to a predetermined control relation with the prime-mover;
    a pilot-responsive link to the variable metering means for the prime-mover intake which link in motion from a rest position overrides the governor control of said metering means thereby permitting non-automatic intake metering;
    a pilot-responsive governor-adjusting circuit operatively associated with said governor so as to permit establishment of a plurality of discrete values of automatic control relation between the governor and the prime-mover;
    an on-off fuel valve between a fuel supply and the prime-mover fuel intake;
    pilot-responsive fuel valve on-off control circuit operatively associated with said fuel valve;
    a pilot-controlled retractable detent which renders fuel valve position dependent upon actuation of said link which dependent fuel valve position is "on" when the detent is at one position and which dependent fuel valve position is "off" when said detent is at any other possible position;
    a mechanical pressure accumulator vented so as to exert its stored pressure against elements of the system, said accumulator having an automatic function dependent upon the actuation of an unloading valve between said accumulator and a variable pressure generator;
    a pilot-responsive mechanical pressure generator arranged serially with an unloading valve and said accumulator so as to create and increase mechanical pressure in and through said accumulator when appropriate;
    an unloading valve functionally situated between said accumulator and said generator so as to permit accumulation of generated pressure and relief of accumulated pressure when appropriate;
    pilot-responsive unloading valve control circuit operatively associated with said unloading valve;
    pilot-controlled retractable detent which can render unloading valve function dependent upon actuation of said link which dependent unloading valve function is to relieve accumulator pressure when said detent is at one position and which dependent unloading valve function is to retain accumulator pressure when said detent is at any other possible position.

2. In a system of torque transmission including a variable torque converter and a governed airbreathing prime mover delivering power to the torque converter, control apparatus comprising:
    a governor operatively conjoined with a variable metering means for the prime-mover intake, said governor varying the intake-metering means according to a predetermined control relation with the prime-mover;
    a pilot-responsive means connected to the variable metering means including a link movable between two different positions, and disengageable locking means on the link and on the metering means cooperating when engaged to move the metering means with the link between said two positions to overide said governor thereby permitting pilot-responsive intake metering; and
    pilot-responsive governor adjusting means associated with the governor to permit establishment of selected discrete values of automatic control relation between the governor and the prime mover.

3. In a system of torque transmission including a variable torque converter and a governed airbreathing prime mover delivering power to the torque converter, control apparatus comprising:
    a governor operatively connected to a variable metering means for the prime mover intake, said governor varying the intake-metering means according to a predetermined control relation with the prime mover;
    pilot responsive means connected to the variable metering means including a manually operated lever spring biased to an off position, a second lever connected to the variable metering means, and a third lever turning about a fixed pivot and operatively connected to the first lever to move therewith, said third lever being movable to a limiting position at which it engages the second lever and beyond which position the second and third levers move in unison to vary the position of the metering means whereby the pilot responsive means overrides said governor permitting pilot responsive intake metering;
    and pilot responsive governor adjusting means associated with the governor to permit establishment of selected discrete values of automatic control relation between the governor and the prime mover.

4. In a system of torque transmission including a variable torque converter and a governed airbreathing prime mover delivering power to the torque converter, control apparatus comprising:
    a governor operatively connected to a variable metering means for the prime mover intake, said governor varying the intake-metering means according to a predetermined control relation with the prime mover;
    a pilot-responsive means connected to the variable metering means including a link movable to a limiting position at which the link overrides said governor thereby permitting pilot-responsive intake metering;
    and pilot-responsive governor adjusting means associated with the governor to permit establishment of selected discrete values of automatic control relation between the governor and the prime mover, said governor adjusting means including
        a rotatably mounted control rod connected to the governor;

a spindle concentric of and rotatable with the control rod and mounted for axial movement relative thereto;

a coil spring anchored at one end and fastened at the other end to the spindle;

and clutch means normally engaged with the spindle by axial force generated by the coil spring to hold the spindle in a selected rotational position, said clutch being disengaged by axial movement of the spindle.

References Cited in the file of this patent

UNITED STATES PATENTS

| | | |
|---|---|---|
| 1,599,389 | Aiken | Sept. 7, 1926 |
| 1,699,653 | Bronander | Jan. 22, 1929 |
| 2,351,041 | Hawley | June 13, 1944 |
| 2,354,597 | Jandasek | July 25, 1944 |
| 2,753,733 | Forster | July 10, 1956 |
| 2,911,077 | Carter | Nov. 3, 1959 |
| 2,996,932 | Gsching | Aug. 22, 1961 |